(12) United States Patent
Fujii et al.

(10) Patent No.: US 8,743,665 B2
(45) Date of Patent: Jun. 3, 2014

(54) LIGHT SOURCE CHIP AND A THERMALLY ASSISTED HEAD WITH THE SAME, AND MANUFACTURING METHODS THEREOF

(71) Applicant: SAE Magnetics (H.K.) Ltd., Hong Kong (CN)

(72) Inventors: Ryuji Fujii, Hong Kong (CN); Tai Boon Lee, Hong Kong (CN); Hideki Tanzawa, Hong Kong (CN); Yasuhiro Konakawa, Hong Kong (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 0 days.

(21) Appl. No.: 13/904,675

(22) Filed: May 29, 2013

(65) Prior Publication Data

US 2013/0258823 A1  Oct. 3, 2013

Related U.S. Application Data

(62) Division of application No. 13/304,437, filed on Nov. 25, 2011, now Pat. No. 8,537,643.

(51) Int. Cl.
*G11B 11/00* (2006.01)

(52) U.S. Cl.
USPC ..................................... 369/13.32

(58) Field of Classification Search
USPC .......... 369/13.32, 13.02, 44.14, 13.01, 13.33, 369/44.19, 44.23; 428/212, 68; 29/603.07, 29/592.1, 603.13

See application file for complete search history.

(56) References Cited

U.S. PATENT DOCUMENTS

| 7,227,817 | B1 | 6/2007 | Redmond et al. |
| 8,254,214 | B2 | 8/2012 | Shimazawa et al. |
| 8,341,825 | B2 | 1/2013 | Hara et al. |
| 8,537,643 | B2 * | 9/2013 | Fujii et al. ................. 369/13.02 |

OTHER PUBLICATIONS

U.S. Appl. No. 13/304,437, filed Nov. 25, 2011, Fujii et al.

* cited by examiner

*Primary Examiner* — Ali Neyzari
(74) *Attorney, Agent, or Firm* — Nixon & Vanderhye, P.C.

(57) ABSTRACT

A manufacturing method of a light source chip for a thermally assisted head comprises steps of (a) providing a light source bar with a surface coating formed thereon; (b) forming several blind holes on the predetermined positions of the light source bar by etching, the blind hole having a top hollowed on the surface coating and a bottom hollowed on the light source bar, and the blind hole having a first biggest width at its top; (c) cutting the light source bar along every two adjacent blind holes by a cutting machine. The cutting machine has a cutting means with a second biggest width that is smaller than the first biggest width of the blind hole, thereby cutting down an individual light source chip without contacting the side edges of the blind hole. Thus a light source chip with a smooth edge and without cracks on the surface can be obtained; and the surface coating formed thereon is hard to be peeled off.

6 Claims, 11 Drawing Sheets

LIGHT SOURCE CHIP AND A THERMALLY ASSISTED HEAD WITH THE SAME, AND MANUFACTURING METHODS THEREOF

CROSS-REFERENCE TO RELATED APPLICATION

This application is a divisional of application Ser. No. 13/304,437 filed Nov. 25, 2011, the entire contents of which is hereby incorporated by reference in this application.

FIELD OF THE INVENTION

The present invention relates to a thermally assisted head with a light source module and, more particularly, to a manufacturing method of a light source chip for a thermally assisted head, a manufacturing method of a thermally assisted head with the same, furthermore to a light source chip and a thermally assisted head formed by these methods.

BACKGROUND OF THE INVENTION

Hard disk drives are common information storage devices. FIG. 1a provides an illustration of a typical disk drive unit 100 essentially consisting of a series of rotatable disks 101 mounted on a spindle motor 102, and a Head Stack Assembly (HSA) 130 which is rotatable about an actuator arm axis 105 for accessing data tracks on disks during seeking. The HSA 130 includes at least one drive arm 104 a head gimbal assembly (HGA) 150. Typically, a spindling voice-coil motor (VCM) is provided for controlling the motion of the drive arm 104.

Referring to FIG. 1b, the HGA 150 includes a thermally assisted head 110 having a slider 103, and a suspension 190 to load or suspend the slider 103 thereon. The suspension 190 includes a load beam 106, a base plate 108, a hinge 107 and a flexure 109, all of which are assembled together. A write transducer and a read transducer (not shown) are embedded in the pole tip of the slider 103 for writing and reading data. When the disk drive is on, a spindle motor 102 will rotate the disk 101 at a high speed, and the slider 103 will fly above the disk 101 due to the air pressure drawn by the rotated disk 101. The slider 103 moves across the surface of the disk 101 in the radius direction under the control of the VCM. With a different track, the slider 103 can read data from or write data to the disk 101.

This thermally assisted head 110 applies a thermal energy source, such as a laser diode at or near the location of the write transducer. This thermal energy source provides energy to the recording medium, which reduces the medium's coercivity to facilitate the writing process. Thus, this thermally assisted head 110 including a laser diode chip become more and more desirable.

Generally, the conventional thermally assisted head with the conventional laser diode chip is made by the following steps, as shown in FIG. 1c.

Step (1001), providing a laser diode bar;

Step (1002), coating an antireflection coating on the laser diode bar;

Step (1003), cutting the laser diode bar into several individual laser diode chips by a scribe device; concretely, forming a groove on the laser diode bar by a blade or a laser beam, and then dividing into individual laser diode chips along the groove.

Step (1004), bonding the laser diode chip on a substrate mount to form a laser diode module;

Step (1005), bonding the laser diode module on a slider to form thermally assisted head.

However, the laser diode module made by the conventional method has several problems on the sequent machining processes which commonly include cleaning process, press process and transfer process and the like. As the blade or laser beam cuts the laser diode bar directly, thus the cutting edge of the laser diode chip is rough, which may increase the possibility of the antireflection coating de-bonding from the laser diode chip. Worse still, the antireflection coating on the laser diode chip will peel off from the laser diode chip body during the cleaning process by brush or by ultrasonic. Moreover, the laser diode chip even will generate some cracks on its surface under the action of some stress during the press process. Therefore, the performances of the laser diode chip and the thermally assisted head are weakened which are undesired by the manufacturer and the consumer.

Accordingly, it is desired to provide improved manufacturing methods of a thermally assisted head and a light source chip, so as to obtain an improved thermally assisted head and light source chip to overcome the above-mentioned drawbacks.

SUMMARY OF THE INVENTION

One objective of the present invention is to provide a manufacturing method of a light source chip for a thermally assisted head, by which a light source chip with a smooth edge and without cracks on the surface can be obtained; and the surface coating formed thereon is hard to be peeled off.

Another objective of the present invention is to provide a light source chip for a thermally assisted head, which the light source chip has a smooth edge and no cracks on the surface, and the surface coating formed thereon is hard to be peeled off, thereby the performance of the light source chip is improved.

Still another objective of the present invention is to provide a manufacturing method of a thermally assisted head, by which a thermally assisted head with an improved light source module can be obtained, the light source chip thereof has a smooth edge and no cracks on its surface, and the surface coating formed thereon is hard to be peeled off.

Yet another objective of the present invention is to provide a thermally assisted head, which includes an improved light source module, the light source chip thereof has a smooth edge and no cracks on the surface, and the surface coating formed thereon is hard to be peeled off, thereby the performance of the light source chip is improved.

To achieve above objectives, a manufacturing method of a light source chip for a thermally assisted head of the present invention includes steps of: (a) providing a light source bar with a surface coating formed thereon; (b) forming several blind holes on the predetermined positions of the light source bar by etching, the blind hole having a top hollowed on the surface coating and a bottom hollowed on the light source bar, and the blind hole having a first biggest width at its top; (c) cutting the light source bar along every two adjacent blind holes by a cutting machine. The cutting machine has a cutting means with a second biggest width that is smaller than the first biggest width of the blind hole, thereby cutting down an individual light source chip without contacting the side edges of the blind hole.

Preferably, the cutting machine comprises a scribe device, and the cutting means comprises a blade or a laser beam.

As an embodiment of the present invention, it further includes coating a protection coating on the side edges of the blind hole before the step (c).

As another embodiment of the present invention, the step (b) further includes steps of: (b1) bonding the light source bar on a carrier with a dry film formed thereon; (b2) coating a resist coating on the surface coating of the light source bar; (b3) exposing and developing a hole on the resist coating; (b4) milling the surface coating and the light source bar along the hole, so as to form the blind hole; and (b5) removing the carrier from the light source bar.

Preferably, the resist coating is a wet resist coating.

Preferably, it further includes forming the blind hole on the light source bar by dry etching Preferably, the dry etching method is the reactive ion etching.

Preferably, the first biggest width of the blind hole has a range of 30 μm 500 μm.

Preferably, the second biggest width of the cutting means of the cutting machine has a range of 10 μm~480 μm.

Preferably, the etching depth of the blind hole on the light source bar has a range of 0.1 μm~30 μm.

Preferably, the bottom of the blind hole has a width that is smaller than the first biggest width.

Alternatively, the cross section of the blind hole is rectangular.

Accordingly, the present invention of a light source chip for a thermally assisted head includes an upper portion and a lower portion connecting with the upper portion. The upper portion has a top surface that is arranged for supporting a surface coating; and the lower portion has a bottom surface that is arranged for connecting with a substrate mount of the thermal assisted head, therein the widths of the upper portion and the surface coating is not larger than that of the lower portion.

As an embodiment of the present invention, a protection coating is formed on the side edges of the surface coating and the upper portion of the light source chip.

Preferably, the surface coating is an antireflection coating. More preferably, the protection coating is a diamond like carbon.

Preferably, the cross section of the upper portion is trapezoid like, and the cross section of the lower portion is rectangular.

Alternatively, the cross sections of the upper portion and the lower portion are rectangular.

A manufacturing method of a thermally assisted head of the present invention steps of providing a slider having an air bearing surface and an opposing surface opposite the air bearing surface; and bonding a light source module on the opposing surface, the light source module including a substrate mount and a light source chip attached on the substrate mount. Therein, forming the light source chip comprises steps of: (a) providing a light source bar with a surface coating formed thereon; (b) forming several blind holes on the predetermined positions of the light source bar by etching, the blind hole having a top hollowed on the surface coating and a bottom hollowed on the light source bar, and blind hole having a first biggest width at its top; (c) cutting the light source bar along every two adjacent blind holes by a cutting machine. Therein the cutting machine has a cutting means with a second biggest width that is smaller than the first biggest width of the blind hole, thereby cutting down an individual light source chip without contacting the side edges of the blind hole.

Preferably, the cutting machine comprises a scribe device, and the cutting means comprises a blade or a laser beam.

As an embodiment of the present invention, it further includes coating a protection coating on the side edges of the blind hole before the step (c).

As another embodiment of the present invention, the step (b) further includes steps of: (b1) bonding the light source bar on a carrier with a dry film formed thereon; (b2) coating a resist coating on the surface coating of the light source bar; (b3) exposing and developing a hole on the resist coating; (b4) milling the surface coating and the light source bar along the hole, so as to form the blind hole; and (b5) removing the carrier from the light source bar.

Preferably, the resist coating is a wet resist coating.

Preferably, it further includes forming the blind hole on the light source bar by dry etching Preferably, the dry etching method is the reactive ion etching.

Preferably, the first biggest width of the blind hole has a range of 30 μm~500 μm.

Preferably, the second biggest width of the cutting means of the cutting machine has a range of 10 μm~480 μm.

Preferably, the etching depth of the blind hole on the light source bar has a range of 0.1 μm~30 μm.

Preferably, the bottom of the blind hole has a width that is smaller than the first biggest width.

Alternatively, the cross section of the blind hole is rectangular.

Accordingly, a thermally assisted head of the present invention includes a slider having an air bearing surface and an opposing surface opposite the air bearing surface; and a light source module formed on the opposing surface, the light source module comprising a substrate mount and a light source chip attached on the substrate mount. The light source chip includes an upper portion and a lower portion connecting with the upper portion, and the upper portion has a top surface that is arranged for supporting a surface coating; and the lower portion has a bottom surface that is arranged for connecting with the substrate mount. And the widths of the upper portion and the surface coating are not larger than that of the lower portion.

As an embodiment of the present invention, a protection coating is formed on the side edges of the surface coating and the upper portion of the light source chip.

Preferably, the surface coating is an antireflection coating. More preferably, the protection coating is a diamond like carbon.

Preferably, the cross section of the upper portion is trapezoid like, and the cross section of the lower portion is rectangular.

Alternatively, the cross sections of the upper portion and the lower portion are rectangular.

In comparison with the prior art, the present invention provides an improved manufacturing method of a thermally assisted head with a light source chip by forming several blind holes on the light source bar by etching beforehand, and then cutting the light source bar along every two adjacent blind holes by a cutting means. Essentially, the cutting means has a second biggest width that is smaller than the first biggest width of the blind hole. Thus, when cutting the light source chip, the cutting means will not contact the side edges of the blind hole, namely the side edges of the surface coating. Therefore, the light source chip has a smooth edge and without any cracks generated on the surface, furthermore, the surface coating will not be peeled off easily. Especially, the light source chip made by this manufacturing method can maintain the above good performance during the sequent machining process which will apply and undergo a high temperature cleaning or brushing, a stress and transfer and the like. Therefore, the performance of the light source chip is improved significantly and, in turn the performance of the thermally assisted head is improved as well.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings:

FIG. 5b is a cross section view of the light source chip shown in FIG. 5a;

FIG. 7b shows cross section views of the light source chip in the manufacturing processes accordingly to FIG. 7a.

DETAILED DESCRIPTION OF ILLUSTRATED EMBODIMENTS

Figure 1A:
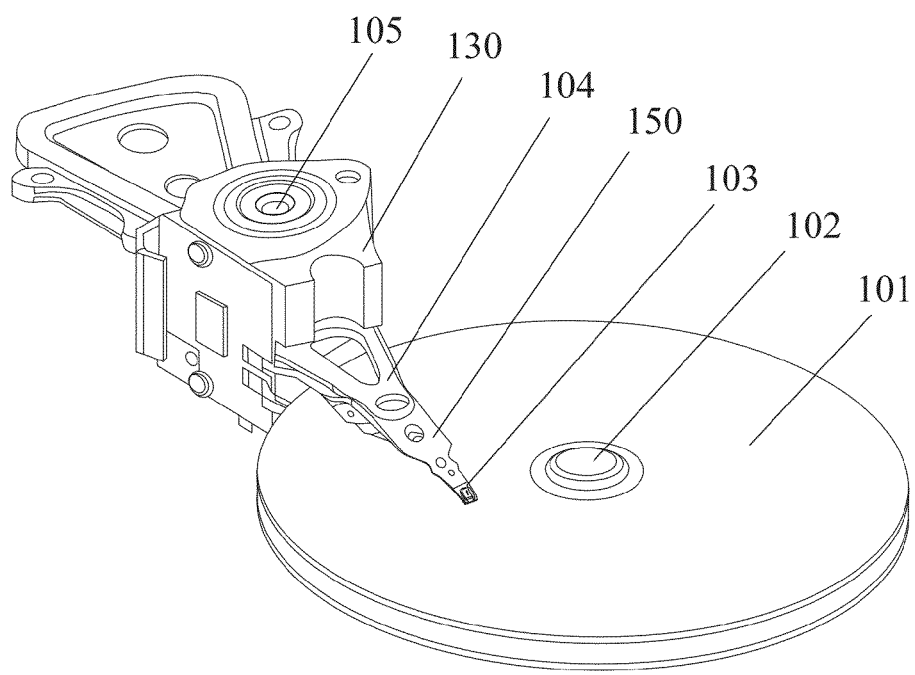
FIG. 1a is a partial perspective view of a conventional disk drive unit.
Figure 1B:
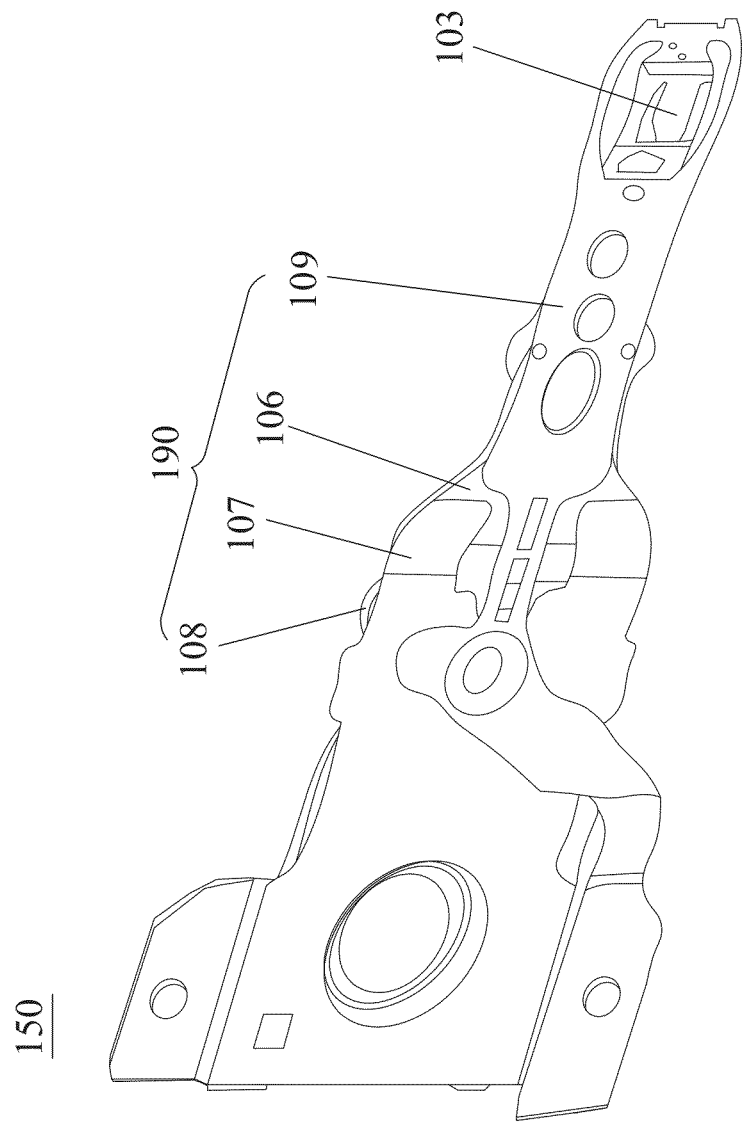
FIG. 1b is a partial top plan view of a conventional HGA.
Figure 1C:
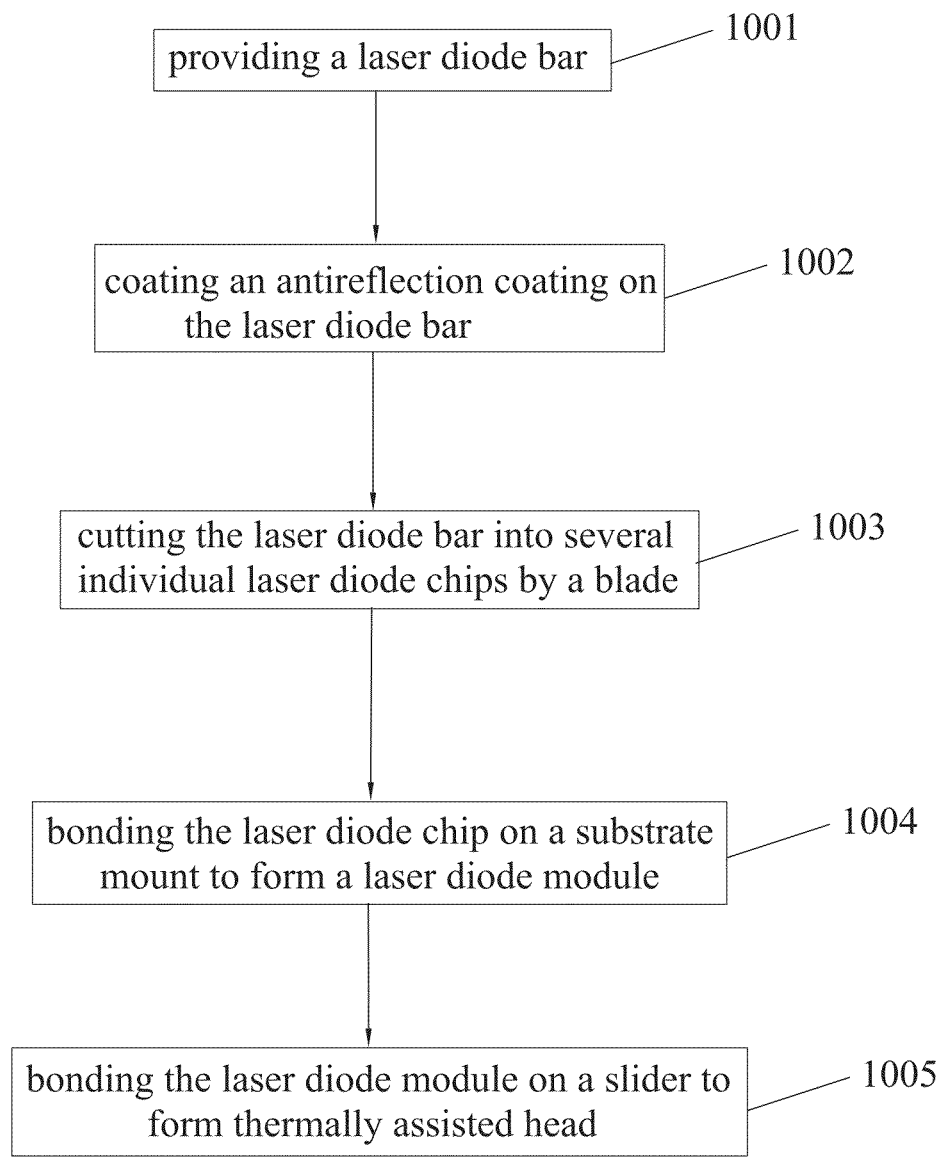
FIG. 1c is a flow chart of the conventional manufacturing method of the conventional thermally assisted head.

Various preferred embodiments of the invention will now be described with reference to the figures, wherein like reference numerals designate similar parts throughout the various views. As indicated above, the invention is directed to manufacturing methods of a thermally assisted head and a light source chip, by which a thermally assisted head with an improved light source module can be obtained, the light source chip thereof has a smooth edge and no cracks on its surface, and the surface coating formed thereon is hard to be peeled off, which improves the performance of the thermally assisted head.

Figure 2:
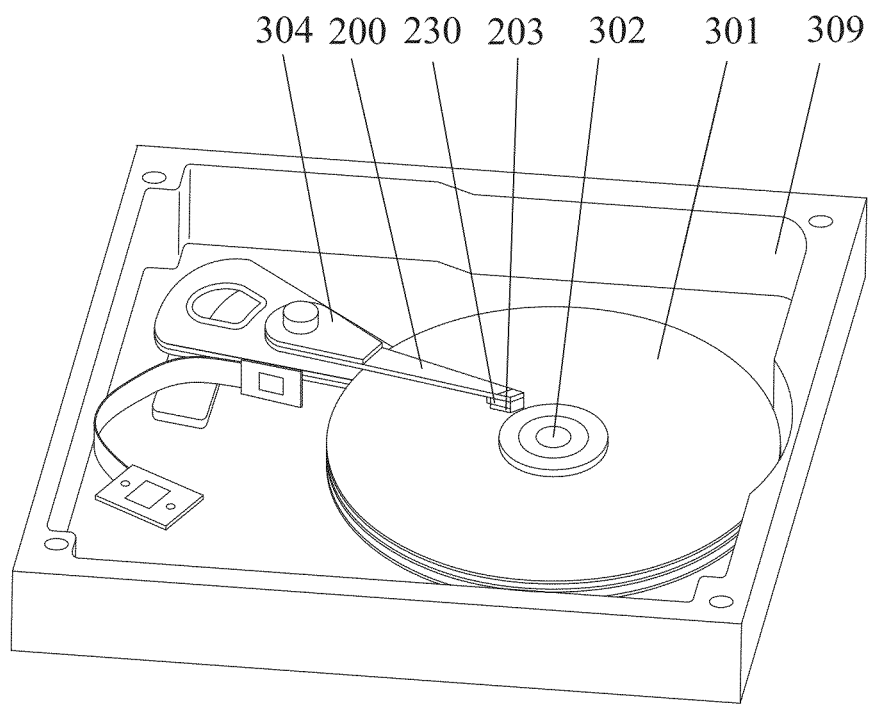
FIG. 2 is a perspective view of a disk drive unit according to an embodiment of the invention.
Figure 3:
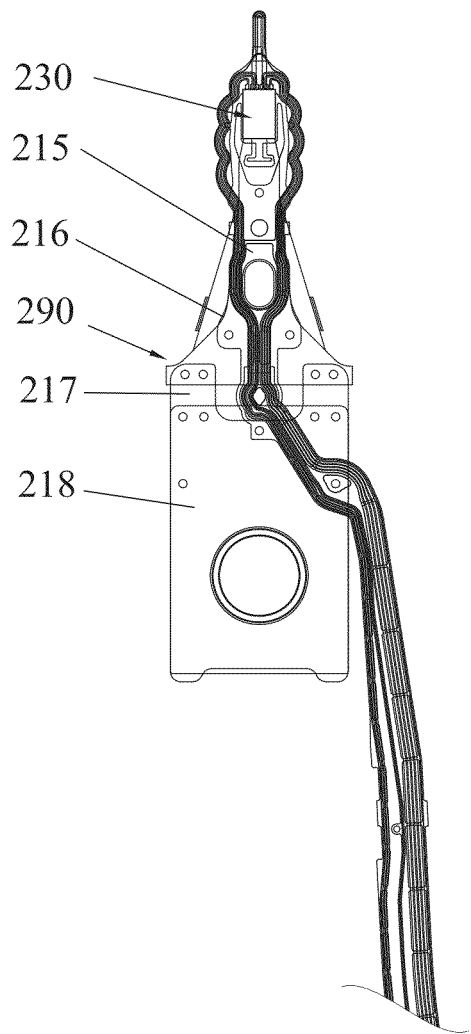
FIG. 3 is a perspective view of the HGA of the disk drive unit shown in FIG. 2.

FIG. 2 is a perspective view of a disk drive unit according to an embodiment of the invention. The disk drive unit 300 includes an HGA 200, a drive arm 304 connected to the HGA 200, a series of rotatable disks 301, and a spindle motor 302 to spin the disk 301, all of which are mounted in a housing 309. As shown in FIG. 3, the HGA 200 includes a suspension 290 and a thermally assisted head 230 carried on the suspension 290. The suspension 290 includes a load beam 216, a base plate 218, a hinge 217 and the flexure 215, all of which are assembled with each other. Specifically, the thermally assisted head 230 is carried on the flexure 215.

Figure 4:
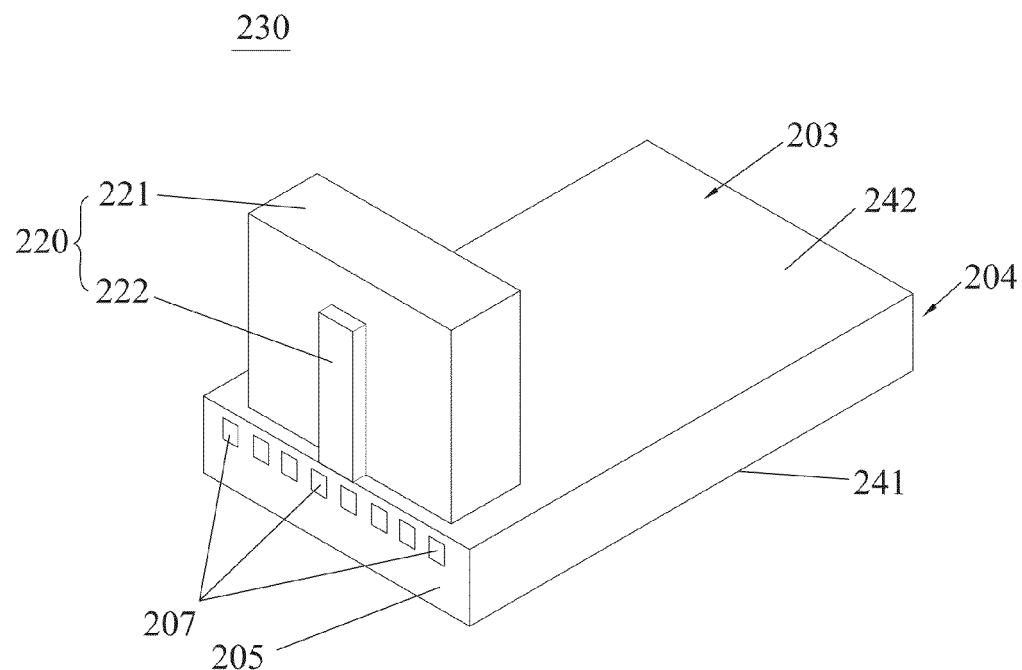
FIG. 4 is a perspective view of a thermally assisted head according to an embodiment of the invention.

As shown in FIG. 4, the thermally assisted head 230 includes a slider 203 and a light source module 220 formed on the slider 203 for thermally assisted magnetic recording, which includes a substrate mount 221 and a light source chip 222 attached on the substrate mount 221. In this embodiment, the light source module 220 is a laser diode module, and the light source chip 222 is a laser diode chip.

Concretely, referring to FIG. 4 again, the slider 203 includes a leading edge 204, a trailing edge 205, and a slider body (not labeled) formed therebetween. The trailing edge 205 has multiple bonding pads 207, such as eight, to couple with a suspension 209 of the HGA 200. And a pole tip (not shown) with read and write elements (not shown) is embedded in the center of the trailing edge 205 for reading and writing operation. The slider body has a surface facing to a disk (not shown) that is called an air bearing surface (ABS) 241, and an opposing surface 242 opposite the ABS 241. Specifically, the substrate mount 221 and the light source chip 222 are mounted on the opposing surface 242. Preferably, the substrate mount 221 and the light source chip 222 are mounted on the trailing portion of the opposing surface 242, thereby electrically connecting with the slider body conveniently.

Figure 5A:
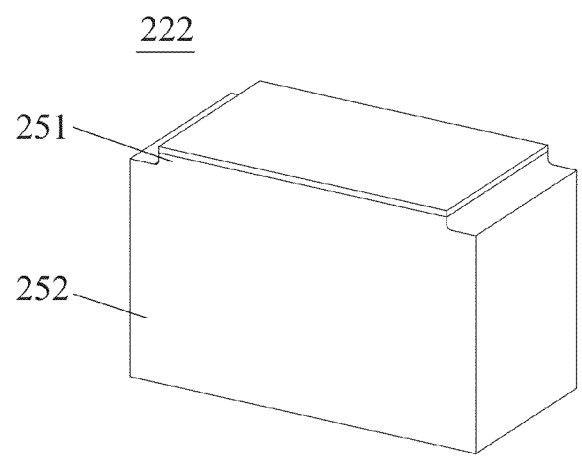
FIG. 5a is a perspective view of the light source chip of the thermally assisted head according to an embodiment of the present invention.
Figure 5B:
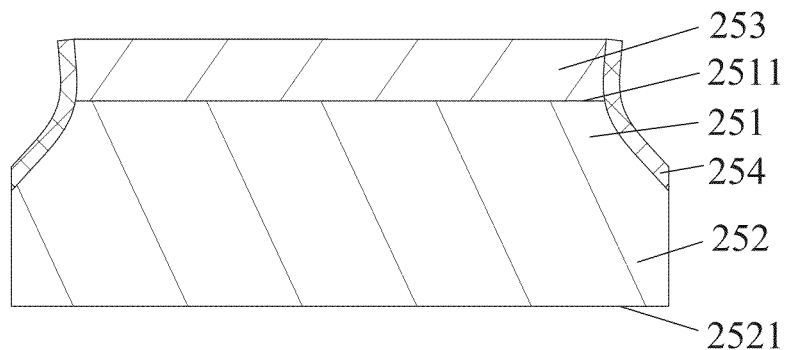

FIG. 5a is a perspective view of the light source chip 222 according to an embodiment of the present invention, FIG. 5b is a cross section view of the light source chip 222. As shown in FIGS. 5a and 5b, the light source chip 222 includes an upper portion 251 and a lower portion 252 connecting with the upper portion 251. Concretely, the upper portion 251 has a top surface 2511 for supporting a surface coating 253 formed thereon, and the lower portion 252 has a bottom surface 2521 for connecting with the substrate mount 221. As a preferable embodiment, the surface coating 253 is an anti-reflection coating.

Figure 5C:
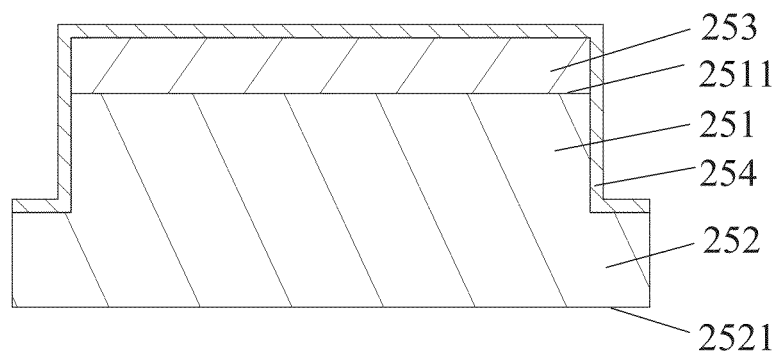
FIG. 5c is a cross section view of the light source chip according to another embodiment of the present invention.

Within the contemplation of the present invention, the upper portion 251 has a width that is not larger than that of the lower portion 252. In this embodiment, the cross section of the upper portion 251 is trapezoid like, and the cross section of the lower portion 252 is rectangular. Specifically, the upper portion 251 includes a rectangular portion and a trapezoid portion. Alternatively, the cross section of the upper portion 251 can be designed to be rectangular, and the cross section of the lower portion 252 is rectangular as well, as shown in FIG. 5c.

Preferably, the light source chip 222 further includes a protection coating 254 wrapped on the side edges of the surface coating 253 and the upper portion 251 to prevent chemical materials penetrating to the interspace between the surface coating 253 and the top surface 2511 of the upper portion 251. Preferably, the protection coating 254 is a diamond-like carbon coating, or other suitable coatings which are not limited here.

Based on the above-mentioned structure of the light source chip 222, the surface coating 253 is hard to be peeled off, and the side edges of the surface coating 253 and the upper portion 251 are smooth, therefore the performance of the light source chip 222 is improved and, in turn, the performance of the thermally assisted head 230 is enhanced as well.

Now the manufacturing method of the light source chip 222 of the thermally assisted head 220 is explained specifically. In this embodiment, the light source chip 222 is the laser diode chip.

Figure 6:
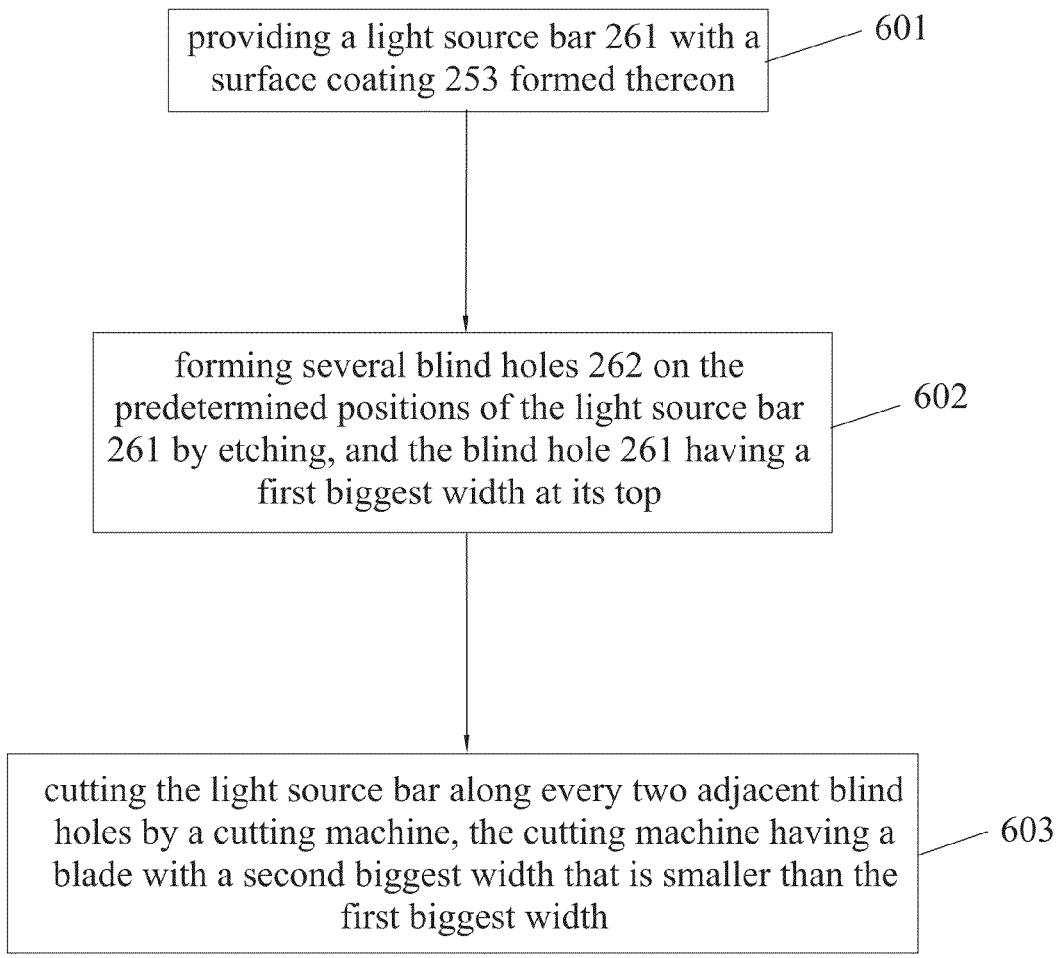
FIG. 6 is a flow chart of the manufacturing of the light source chip according to a first embodiment of the present invention.

FIG. 6 shows a flow chart of forming the light source chip 222 according to a first embodiment of the present invention, which includes follow steps at least:

Step (601), providing a light source bar 261 with a surface coating 253 formed thereon;

Step (602), forming several blind holes 262 on the predetermined positions of the light source bar 261 by etching, and the blind hole 262 having a first biggest width at its top; and Step (603), cutting the light source bar along every two adjacent blind holes by a cutting machine, the cutting machine having a cutting means with a second biggest width that is smaller than the first biggest width.

Concretely, the cutting machine is a scribe device, and the cutting means can be a blade or a laser beam.

Figure 7A:
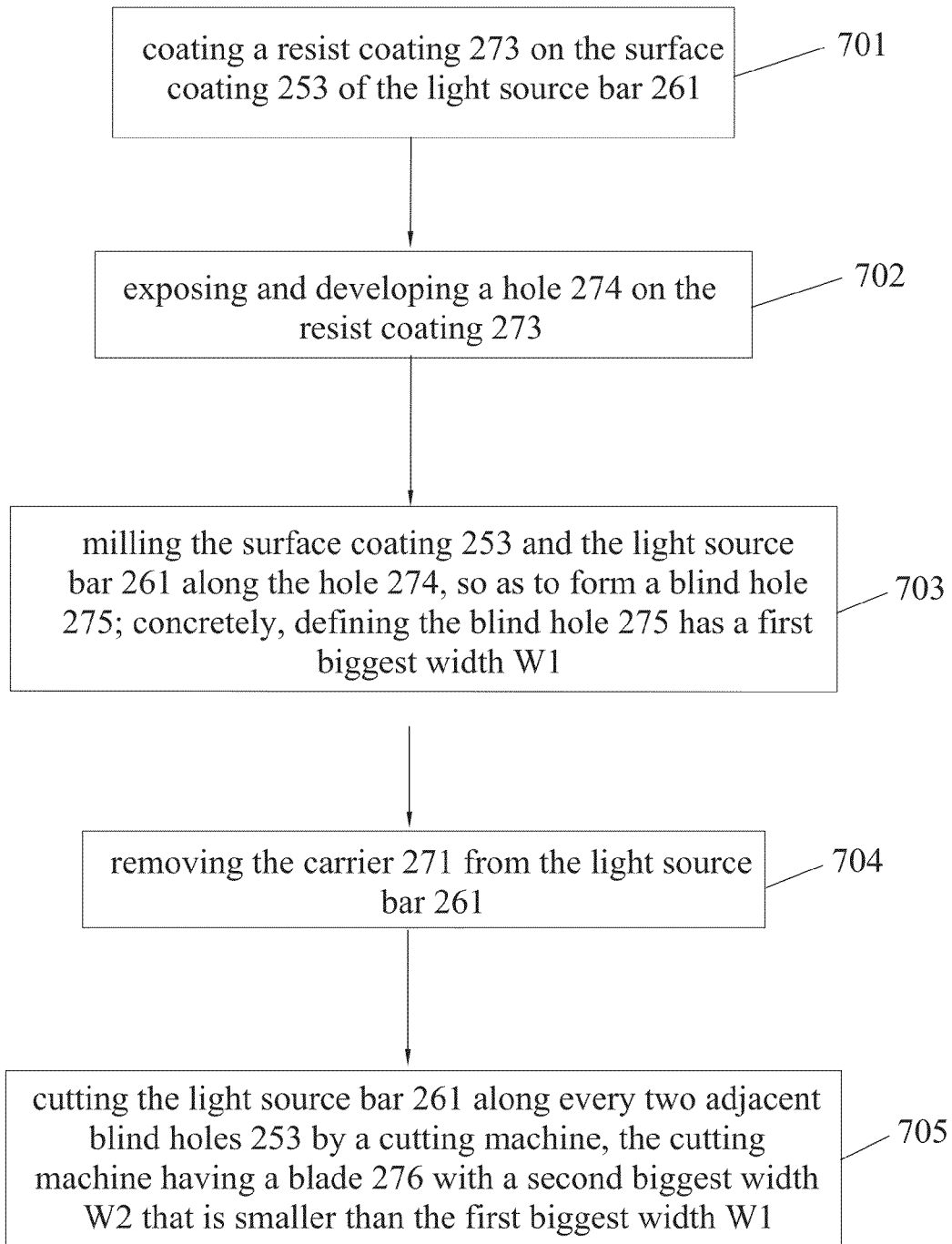
FIG. 7a is a flow chart of the manufacturing of the light source chip according to a second embodiment of the present invention.

As a preferable embodiment, FIG. 7a shows a detailed and preferable flow chart of making the light source chip 222.

Step (701), providing a light source bar 261 with a surface coating 253 formed thereon;

Step (702), bonding the light source bar 261 on a carrier 271 with a dry film 272 formed thereon;

Step (703), coating a resist coating 273 on the surface coating 253 of the light source bar 261;

Step (704), exposing and developing a hole 274 on the resist coating 273;

Step (705), milling the surface coating 253 and the light source bar 261 along the hole 274, so as to form a blind hole 275; concretely, defining the blind hole 275 has a first biggest width W1;

Step (706), removing the carrier 271 from the light source bar 261; and

Step (707), cutting the light source bar 261 along every two adjacent blind holes 275 by a cutting machine, the cutting machine having a blade 276 with a second biggest width W2 that is smaller than the first biggest width W1 of the blind holes 275.

Figure 7B:
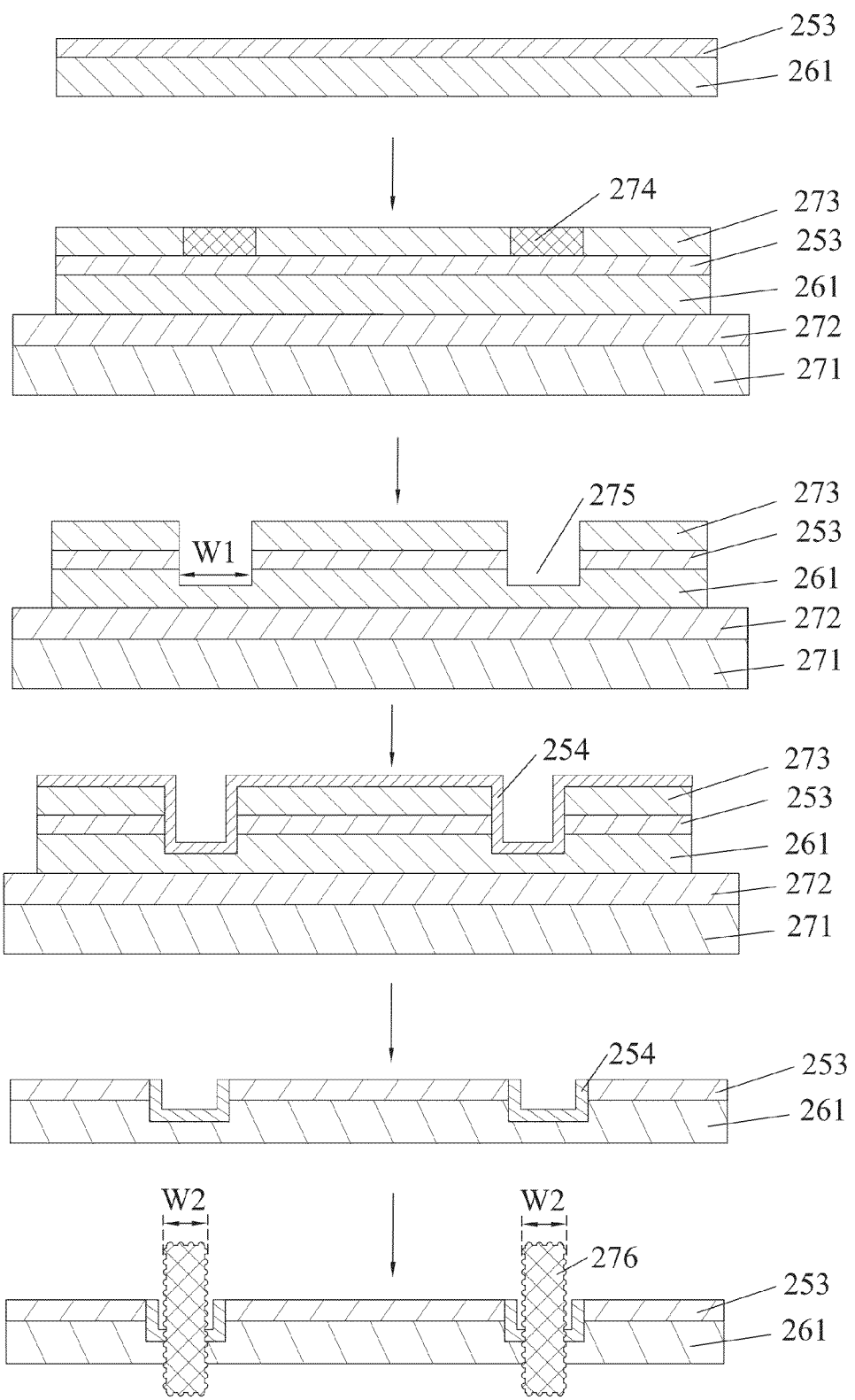

Accordingly, FIG. 7b shows the cross section views of the light source chip 222 in the manufacturing processes accordingly to FIG. 7a.

Combining with FIGS. 7a and 7b, the dry film 272 in the step (702) is adapted for making the carrier 271 easy to de-bond. Concretely, in the step (704), the resist coating 273 is a wet resist coating. Preferably, before performing the step (704), it's better to bake the resist coating 273 under 90° C. In this embodiment, the etching method is a dry etching method, such as reactive ion etching method. Preferably, the method further includes coating a protection coating 254 on the surface of the resist coating 273 and covering the edges of the blind hole 275 after the step (705) and before the step (706).

In this embodiment, the cross sections of the hole 274 in the step (704) and the blind hole 275 in the step (705) are rectangular. The first biggest width W1 of the blind hole 275 has a range of 30 μm~500 μm, such as 65 μm in this embodiment; and the etching depth of the blind hole 275 extending into the light source bar 271 has a range of 0.1 μm~30 μm, such as 2 μm. The second biggest width W2 of the blade 276 or the laser beam of the cutting machine is smaller than the first biggest width W1 of the blind hole 275, which has a range of 10 μm~480 μm, such as 45 μm herein.

Certainly, it further includes several machining processes to the light source chip 222 after the cutting process, for example the cleaning process, pressing process and the like, whose explanations are omitted herein.

Figure 8:
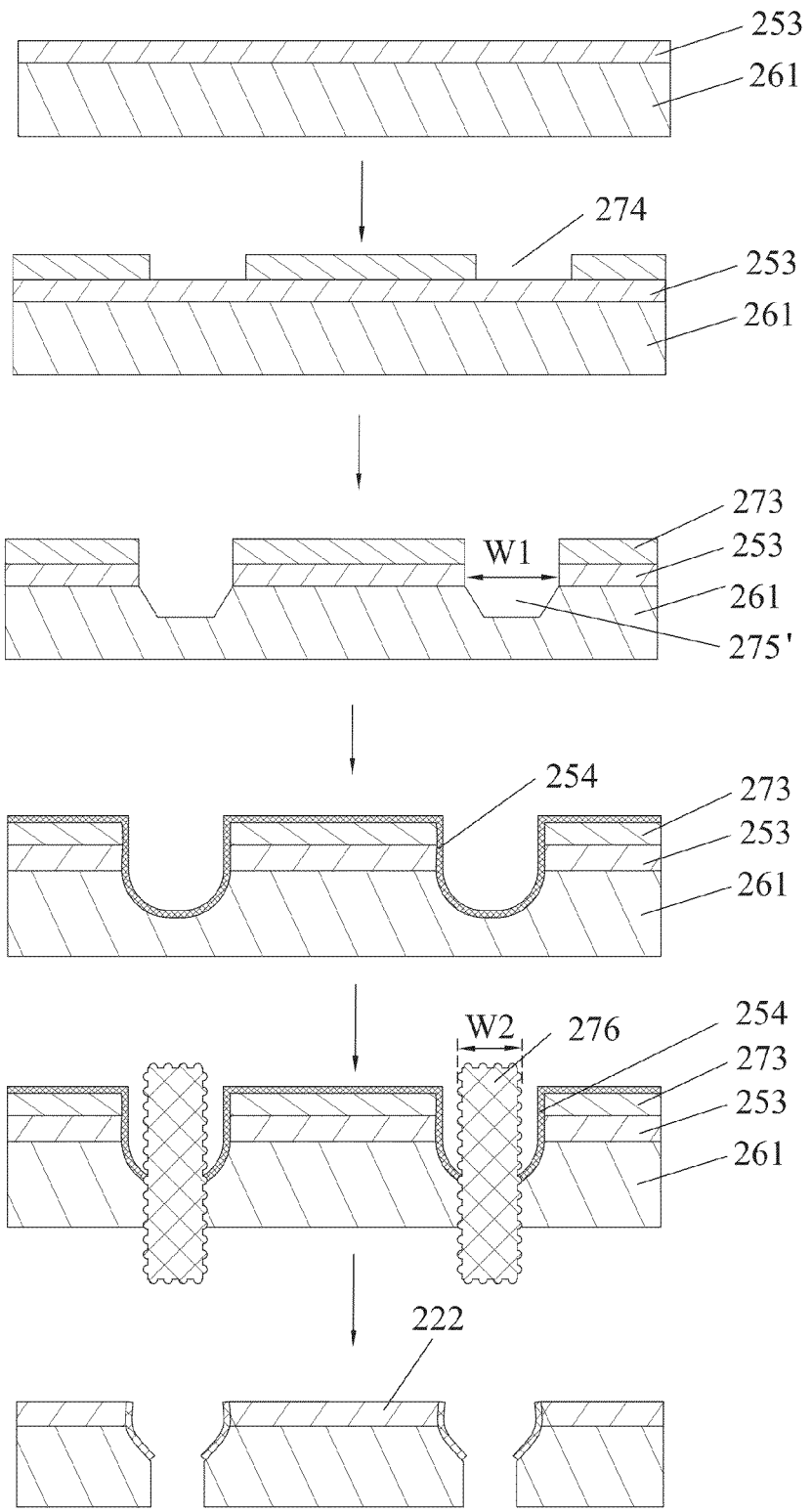
FIG. 8 shows cross section views of the light source chip according to manufacturing processes of another embodiment of the present invention.

As another embodiment, FIG. 8 shows the manufacturing processes of the light source chip 222, which is different from FIG. 7b in some respects. And the carrier is omitted in these views.

Concretely, the cross section of the blind hole 275' in this embodiment is taper-like, which includes a wider top (not labeled) and a narrow bottom (not labeled). Specifically, the top is the portion that is dug on the surface coating 253, and the bottom is the portion that is extended into the light source bar 261. Concretely, the width of the bottom of the blind hole 275' is smaller than the first biggest width W1.

Similarly to the first embodiment, the second biggest width W2 of the blade 276 is smaller than the first biggest width W1 of the blind hole 275', thereby the blade 276 will not contact the side edges of the blind hole 275', that is, when cutting the light source chip 222, the blade 276 will not contact the side edges of the surface coating 253. Therefore, the light source chip 222 has a smooth edge and without any cracks generated on the surface, furthermore, the surface coating 253 will not be peeled off easily as the blade 276 failed to contact the side edge of the surface coating 253. Especially, the light source chip 222 made by this manufacturing method can maintain the above good performance during the sequent machining process which will apply and undergo a high temperature cleaning or brushing, a stress and transfer and the like.

Therefore, an improved light source chip 222 is obtained by the above-mentioned method. Based on the manufacturing processes, for forming a thermally assisted head included such a light source chip, it further includes steps of: 1) providing a slider having an ABS and an opposing surface opposite the ABS; 2) attaching the light source chip obtained by the above-mentioned method on a substrate mount, to form a light source module; and 3) bonding the light source module on the opposing surface of the slider.

Compared with the prior art, the present invention aims at providing an improved manufacturing method of a thermally assisted head an light source chip by forming several blind holes on the light source bar by etching beforehand, and then cutting the light source bar along every two adjacent blind holes by a blade or a laser beam. Essentially, the blade or a laser beam has a second biggest width W2 that is smaller than the first biggest width W1 of the blind hole. Thus, when cutting the light source chip, the blade will not contact the side edges of the blind hole, namely the side edges of the surface coating. Therefore, the light source chip has a smooth edge and without any cracks generated on the surface, furthermore, the surface coating will not be peeled off easily. Especially, the light source chip made by this manufacturing method can maintain the above good performance during the sequent machining process which will apply and undergo a high temperature cleaning or brushing, a stress and transfer and the like. By this token, the performance of the light source chip is improved significantly and, in turn the performance of the thermally assisted head is improved as well.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A thermally assisted head, comprising:
    a slider having an air bearing surface and an opposing surface opposite the air bearing surface; and
    a light source module formed on the opposing surface, the light source module comprising a substrate mount and a light source chip attached on the substrate mount;
    wherein the light source chip comprises an upper portion and a lower portion connecting with the upper portion, and the upper portion has a top surface that is arranged for supporting a surface coating; and the lower portion has a bottom surface that is arranged for connecting with the substrate mount;
    wherein the widths of the upper portion and the surface coating are not larger than that of the lower portion.

2. The thermally assisted head as claimed in claim 1, wherein a protection coating is formed on the side edges of the surface coating and the upper portion of the light source chip.

3. The thermally assisted head as claimed in claim 1, wherein the surface coating is an antireflection coating.

4. The thermally assisted head as claimed in claim 3, wherein the protection coating is a diamond like carbon.

5. The thermally assisted head as claimed in claim 1, wherein the cross sections of the upper portion and the lower portion are rectangular.

6. The thermally assisted head as claimed in claim 1, wherein the cross section of the upper portion is trapezoid like, and the cross section of the lower portion is rectangular.

* * * * *